United States Patent
Sivaswamy et al.

(10) Patent No.: US 11,593,746 B2
(45) Date of Patent: Feb. 28, 2023

(54) IDENTIFYING PRODUCTS FOR STABLE DELIVERY USING INTERNET OF THINGS

(71) Applicant: International Business Machines Corporation, Armonk, NY (US)

(72) Inventors: Hemant Kumar Sivaswamy, Pune (IN); Sachin Suhas Patwardhan, Pune (IN); Kulkarni Nidhi Sanjay, Pune (IN); Akanksha Joshi, Pune (IN)

(73) Assignee: International Business Machines Corporation, Armonk, NY (US)

( * ) Notice: Subject to any disclaimer, the term of this patent is extended or adjusted under 35 U.S.C. 154(b) by 601 days.

(21) Appl. No.: 16/676,614

(22) Filed: Nov. 7, 2019

(65) Prior Publication Data
US 2021/0142269 A1 May 13, 2021

(51) Int. Cl.
| | | |
|---|---|---|
| *G06Q 90/00* | (2006.01) | |
| *G06Q 10/0832* | (2023.01) | |
| *B65D 81/02* | (2006.01) | |
| *G06N 20/00* | (2019.01) | |
| *G06V 20/20* | (2022.01) | |

(52) U.S. Cl.
CPC ......... *G06Q 10/0832* (2013.01); *B65D 81/02* (2013.01); *G06N 20/00* (2019.01); *G06V 20/20* (2022.01)

(58) Field of Classification Search
CPC ......... G06N 20/00; G06V 20/20; B65D 81/00
USPC .......................... 235/376, 384, 385; 705/332
See application file for complete search history.

(56) References Cited

U.S. PATENT DOCUMENTS

| | | | |
|---|---|---|---|
| 3,961,764 A * | 6/1976 | Keough ................. | A63H 27/08 244/155 R |
| 4,461,436 A | 7/1984 | Messina | |
| 9,373,149 B2 * | 6/2016 | Abhyanker .......... | G05D 1/0238 |
| 10,730,626 B2 * | 8/2020 | Gil ........................ | B64F 1/0299 |
| 10,878,362 B2 * | 12/2020 | Perez .................... | G06Q 10/083 |
| 11,009,868 B2 * | 5/2021 | Ferguson .............. | G08G 1/0145 |
| 11,276,261 B2 * | 3/2022 | Rephlo ................. | G06Q 10/083 |
| 11,307,753 B2 * | 4/2022 | Haramati .............. | G06F 40/186 |
| 11,315,169 B2 * | 4/2022 | Chiyo .................. | G06Q 30/0601 |
| 11,321,766 B1 * | 5/2022 | Chowdhary ......... | G06Q 30/0637 |

(Continued)

FOREIGN PATENT DOCUMENTS

WO 2017128062 A1 8/2017

OTHER PUBLICATIONS

Corrigan, "Drone Gyro Stabilization, IMU And Flight Controllers Explained", DroneZon Drone Technology, Knowledge, News & Reviews, Jul. 2, 2019, 9 pps., <https://www.dronezon.com/learn-about-drones-quadcopters/three-and-six-axis-gyro-stabilized-drones/>.

*Primary Examiner* — Daniel St. Cyr
(74) *Attorney, Agent, or Firm* — Aaron Pontikos

(57) ABSTRACT

Aspects of the present invention disclose a method for identifying items that can utilize stabilized delivery in a delivery system. The method includes one or more processors obtaining data indicating a delivery item from an internet of things (IoT) enabled device. The method further includes determining information associated with the delivery item. The method further includes determining whether the information of the delivery item is associated with stabilized delivery. The method further includes scheduling delivery of the delivery item with a delivery vehicle, based at least in part on the information associated with the delivery item.

17 Claims, 3 Drawing Sheets

(56) References Cited

U.S. PATENT DOCUMENTS

| | | | |
|---|---|---|---|
| 2005/0022402 A1* | 2/2005 | Ash | E21B 47/022 |
| | | | 33/321 |
| 2010/0258681 A1* | 10/2010 | Chen | B64C 39/001 |
| | | | 244/34 A |
| 2011/0084162 A1 | 4/2011 | Goossen | |
| 2017/0174343 A1 | 6/2017 | Erickson | |
| 2017/0267348 A1 | 9/2017 | Sweeny | |
| 2017/0300855 A1 | 10/2017 | Lund | |
| 2019/0279181 A1* | 9/2019 | Kelly | G06Q 20/12 |
| 2020/0380467 A1* | 12/2020 | Chen | G01C 21/343 |

\* cited by examiner

US 11,593,746 B2

IDENTIFYING PRODUCTS FOR STABLE DELIVERY USING INTERNET OF THINGS

BACKGROUND OF THE INVENTION

The present invention relates generally to the field of internet of things and more particularly to identifying items for secure delivery.

The Internet of Things (IoT) generally refers to the global infrastructure that interconnects things to the Internet. Things within IoT may refer to uniquely identifiable physical things or virtual things that are accessible via network connections. Such things can be incorporated into the information network through an intelligent interface. An IoT system can refer to any system in the Internet of Things. An IoT system may include, for example, one or more end devices such as sensors, which may be referred to as front ends. The IoT system may include gateways to other networks, which may be referred to as backends.

A delivery device is a vehicle used to transport packages, food or other goods. Delivery devices are unmanned electromechanical devices that can deliver lightweight packages. Delivery devices are operated remotely, with operators potentially overseeing multiple delivery devices at once.

Cognitive analytics combines the use of cognitive computing and analytics. Cognitive computing combines artificial intelligence and machine-learning algorithms, in an approach that attempts to reproduce the behavior of the human brain. Analytics is the scientific process of transforming data into insights for making better decisions. Cognitive analytics applies intelligent technologies to bring unstructured data sources within reach of analytics processes for decision making.

SUMMARY

Aspects of the present invention disclose a method, computer program product, and system for identifying items that can utilize stabilized delivery in a delivery system. The method includes one or more processors obtaining data indicating a delivery item from an internet of things (IoT) enabled device. The method further includes one or more processors determining information associated with the delivery item. The method further includes one or more processors determining whether the information of the delivery item is associated with stabilized delivery. The method further includes one or more processors scheduling delivery of the delivery item with a delivery vehicle, based at least in part on the information associated with the delivery item.

DETAILED DESCRIPTION

Embodiments of the present invention allow for identifying items that require stabilized delivery in a last mile supply chain delivery system. Embodiments of the present invention utilizes data of an Internet of Things (IoT) enabled device to identify an item corresponding to a purchase. Embodiments of the present invention generate packaging instructions for an item based on an identification of the item. Additional embodiments of the present invention schedules delivery of an identified item with a delivery vehicle that includes a gyro-enabled capsule.

Some embodiments of the present invention recognize that challenges exist in preventing spillage and damage of items with liquid and semi-solid states with regard to transporting the amorphous items. Although, advances in technology have improved stabilization of delivery vehicles, amorphous items attached to delivery vehicles are still impacted by inertial forces caused by maneuvers of delivery vehicles. Various embodiments of the present invention solve this challenge by utilizing IoT data feeds, machine learning, and past delivery feedback to identify an amorphous item and generate instructions for delivery utilizing a gyro-stabilized capsule.

Implementation of embodiments of the invention may take a variety of forms, and exemplary implementation details are discussed subsequently with reference to the Figures.

Figure 1:
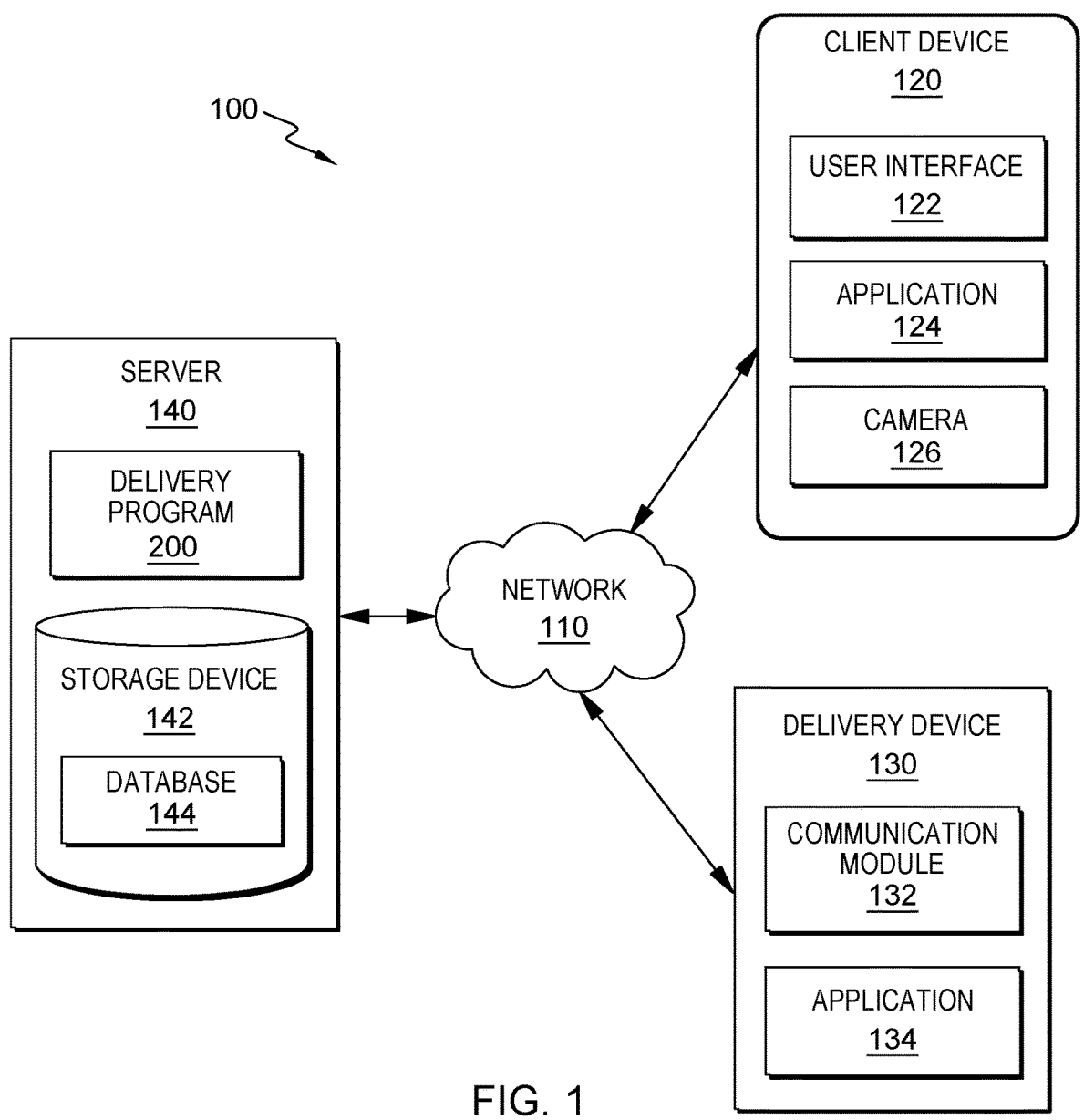
FIG. 1 is a functional block diagram of a data processing environment, in accordance with an embodiment of the present invention.

The present invention will now be described in detail with reference to the Figures. FIG. 1 is a functional block diagram illustrating a distributed data processing environment, generally designated 100, in accordance with one embodiment of the present invention. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

The present invention may contain various accessible data sources, such as database 144, that may include personal data, content, or information the user wishes not to be processed. Personal data includes personally identifying information or sensitive personal information as well as user information, such as tracking or geolocation information. Processing refers to any, automated or unautomated, operation or set of operations such as collection, recording, organization, structuring, storage, adaptation, alteration, retrieval, consultation, use, disclosure by transmission, dissemination, or otherwise making available, combination, restriction, erasure, or destruction performed on personal data. Delivery program 200 enables the authorized and secure processing of personal data. Delivery program 200 provides informed consent, with notice of the collection of personal data, allowing the user to opt in or opt out of processing personal data. Consent can take several forms. Opt-in consent can impose on the user to take an affirmative action before personal data is processed. Alternatively, opt-out consent can impose on the user to take an affirmative action to prevent the processing of personal data before personal data is processed. Delivery program 200 provides information regarding personal data and the nature (e.g., type, scope, purpose, duration, etc.) of the processing. Delivery program 200 provides the user with copies of stored personal data. Delivery program 200 allows the correction or completion of incorrect or incomplete personal data. Delivery program 200 allows the immediate deletion of personal data.

An embodiment of data processing environment 100 includes client device 120, delivery device 130, and server 140, all interconnected over network 110. In one embodiment, client device 120, delivery device 130, and server 140 communicate through network 110. Network 110 can be, for example, a local area network (LAN), a telecommunications network, a wide area network (WAN), such as the Internet, or any combination of the three, and include wired, wireless, or fiber optic connections. In general, network 110 can be any combination of connections and protocols, which will support communications between client device 120, delivery device 130, and server 140, in accordance with embodiments of the present invention. In an example, client device 120 provides images of an item (e.g., on a conveyor belt) to server 140 via network 110. In this example, server 140 generates delivery instructions that correspond to the item and then server 140 transmits delivery instructions to delivery device 130 via network 110.

In various embodiments of the present invention, client device 120 may be a workstation, personal computer, digital video recorder (DVR), media player, personal digital assistant, mobile phone, digital camera, or any other device capable of executing computer readable program instructions, in accordance with embodiments of the present invention. In general, client device 120 is representative of any electronic device or combination of electronic devices capable of executing computer readable program instructions. Client device 120 may include components as depicted and described in further detail with respect to FIG. 3, in accordance with embodiments of the present invention.

Client device 120 includes one or more speakers, a processor, an IoT sensor, a camera, user interface 122, and application 124. User interface 122 is a program that provides an interface between a user of client device 120 and a plurality of applications that reside on the client device. A user interface, such as user interface 122, refers to the information (such as graphic, text, and sound) that a program presents to a user, and the control sequences the user employs to control the program. A variety of types of user interfaces exist. In one embodiment, user interface 122 is a graphical user interface. A graphical user interface (GUI) is a type of user interface that allows users to interact with electronic devices, such as a computer keyboard and mouse, through graphical icons and visual indicators, such as secondary notation, as opposed to text-based interfaces, typed command labels, or text navigation. In computing, GUIs were introduced in reaction to the perceived steep learning curve of command-line interfaces which require commands to be typed on the keyboard. The actions in GUIs are often performed through direct manipulation of the graphical elements. In another embodiment, user interface 122 is a script or application programming interface (API).

Application 124 is a computer program designed to run on client device 120. An application frequently serves to provide a user with similar services accessed on personal computers (e.g., web browser, playing music, or other media, etc.). In one embodiment, a user utilizes application 124 of client device 120 to provide content to delivery program 200. For example, application 124 is a web application (e.g., client-server computer program) of delivery program 200 that is utilized to transmit digital images client device 120 captures and transmits the digital images to delivery program 200.

In various embodiments of the present invention, delivery device 130 may be an unmanned electro-mechanical device that includes a ground-based controller, which may be remote controlled by a human operator, that is capable of executing computer readable program instructions, in accordance with embodiments of the present invention. In general, delivery device 130 is representative of any electronic device or combination of electronic devices capable of executing computer readable program instructions. Delivery device 130 may include components as depicted and described in further detail with respect to FIG. 3, in accordance with embodiments of the present invention.

Delivery device 130 may include one or more speakers, a processor, an IoT sensor, a navigational system, a camera, communications module 132, and application 134. Communications module 132 may be a radio transmitter/receiver, application, or a computer utilized to control delivery device 130. In addition, communications module 132 may be a global positioning system (GPS) or satellite receivers to navigate to a predetermined location. In one embodiment delivery device 130 transports an item corresponding to a purchase of a user to an address of the user. In another embodiment, delivery device 130 utilizes application 134 to receive delivery instructions of delivery program 200. For example, application 134 is a client-server computer program of delivery program 200 that is a functional equivalent of application 124 discussed above.

In another embodiment, delivery device 130 delivers an item that is included in a container that is coupled to a gyroscopic device. In various embodiments of the present invention, a gyroscopic device can include a positional gyroscope, where a deviation from a selected direction generates a directing force that returns an axis of the positional gyroscope to the selected position. For example, delivery device 130 uses a gyro-enabled capsule to transport an item to an address of a user. In this example, the gyro-enabled capsule that includes the item is coupled to delivery device 130. Furthermore, inertial effects (e.g., acceleration, deceleration, external forces, etc.) of delivery device 130 during transport of the item are reduced or negated by the gyro-enabled capsule, which prevents spills and/or damage of the item.

In various embodiments of the present invention, server 140 may be a desktop computer, a computer server, or any other computer systems, known in the art. In certain embodiments, server 140 represents computer systems utilizing clustered computers and components (e.g., database server computers, application server computers, etc.), which act as a single pool of seamless resources when accessed by elements of data processing environment 100. In general, server 140 is representative of any electronic device or combination of electronic devices capable of executing computer readable program instructions. Server 140 may include components as depicted and described in further detail with respect to FIG. 3, in accordance with embodiments of the present invention.

Server 140 includes storage device 142, database 144, and delivery program 200. Storage device 142 can be implemented with any type of storage device, for example, persistent storage 305, which is capable of storing data that may be accessed and utilized by server 140, delivery device 130, and client device 120, such as a database server, a hard disk drive, or a flash memory. In one embodiment storage device 142 can represent multiple storage devices within server 140. In various embodiments of the present invention, storage device 142 stores a plurality of information, such as database 144. Database 144 may represent one or more organized collections of data stored and accessed from server 140. For example, database 144 includes state information of an item, images of an item, past item damage information, and/or delivery information. In one embodiment, data processing environment 100 can include additional servers (not shown) that host additional information that accessible via network 110.

Generally, delivery program 200 utilizes artificial intelligence and machine learning techniques to identify items that can utilize stabilization during transportation via a delivery vehicle. In one embodiment, delivery program 200 identifies an item utilizing data of client device 120. For example, delivery program 200 utilizes images of client device 120 and machine learning techniques to determine a type and content of an item. In this example, delivery program 200 utilizes data of past damaged deliveries to determine the type and the content of an item.

In another embodiment, delivery program 200 determines whether an item can utilize a gyro-enabled capsule for delivery via delivery device 130. For example, delivery program 200 utilizes a machine learning algorithm to determine that an item can utilize delivery in a gyro-enabled capsule. In yet another embodiment, delivery program 200 schedules a delivery of an item with delivery device 130. For example, delivery program 200 provides delivery instructions to delivery device 130 via network 110 that corresponds to an item that includes an amorphous state. Furthermore, the amorphous state includes natural and man-made materials that are solid but lack the long-range order that is characteristic of a crystal (e.g., glass, plastic, gel, etc.).

Figure 2:
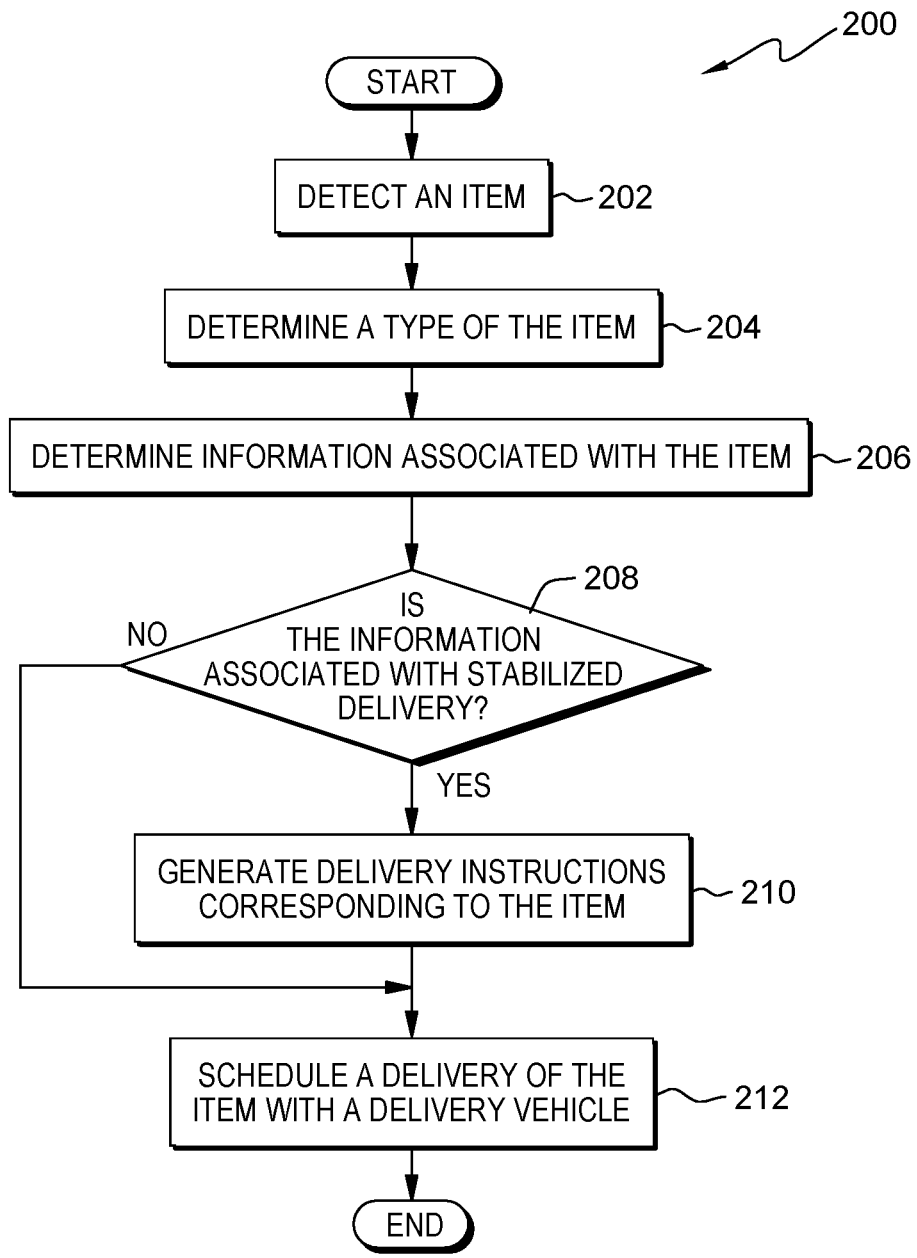
FIG. 2 is a flowchart depicting operational steps of a program, within the data processing environment of FIG. 1, for identifying items that can utilize stabilized delivery in a delivery system, in accordance with embodiments of the present invention.

FIG. 2 is a flowchart depicting operational steps of delivery program 200, a program to identify items that can utilize stabilized delivery in a delivery system, in accordance with embodiments of the present invention. In one embodiment, delivery program 200 initiates in response to detecting an item in a data feed of client device 120. For example, delivery program 200 initiates in response to detecting an object corresponding to a purchased item on a conveyor belt in an image of a digital camera (e.g., client device 120). In another embodiment, delivery program 200 is continuously monitoring client device 120. For example, delivery program 200 is constantly monitoring images of a digital camera (e.g., client device 120) to detect an object corresponding to a purchased item on a conveyor belt in an image of the digital camera.

In step 202, delivery program 200 detects an item. In one embodiment, delivery program 200 utilizes data of client device 120 to detect an item. For example, delivery program 200 uses a data feed of a digital camera (e.g., client device 120) that includes digital images to detect an item (e.g., box, cup, food, bottle, etc.) on a conveyor belt in queue for packing prior to delivery. In this example, delivery program 200 utilizes digital image processing techniques (e.g., object detection) to detect semantic objects (e.g., box, cup, food, bottle, etc.) in the digital images of the digital camera (e.g., camera 126).

Furthermore, delivery program 200 utilizes a machine learning approach (e.g., scale-invariant feature transform, histogram of oriented gradients, etc.) and past images of delivered items of a database (e.g., database 144) are utilized to define features. Additionally, delivery program 200 uses the past images of delivered items to create a labeled set of training data that includes the defined features, which is used to train a support vector machine (SVM), and a test set of images, which is used to test the accuracy of the SVM. Also, delivery program 200 uses the SVM to detect the semantic objects on the conveyor belt included in the digital images of the digital camera.

In another embodiment, delivery program 200 receives data indicating an item for a delivery. For example, delivery program 200 receives order confirmation notification (e.g., text that includes a label of an item) corresponding to a purchase of the item by a user. In this example, delivery program 200 utilizes natural language processing (NLP) to derive whether the order confirmation notification includes shipping information and determines that the item is being prepared for delivery.

In step 204, delivery program 200 determines a type of the item. In various embodiments of the present invention delivery program 200 may utilize visual recognition techniques, which may include one or more models (e.g., general, food, custom, etc.) to determine a type (e.g., classification) of a detected item of an image. In one embodiment, delivery program 200 utilizes data of client device 120 to determine a type of a detected item. For example, delivery program 200 uses a data feed of a digital camera (e.g., client device 120) that includes digital images to determine a classification (e.g., type) of a detected item in queue for packing prior to delivery on a conveyor belt. In this example, delivery program 200 utilizes visual recognition to assign a classification to a detected semantic object (e.g., box, cup, food, types of food, bottle, etc.) on the conveyor belt included in the digital images of the digital camera.

In another embodiment, delivery program 200 utilizes data of database 144 to determine a type of a detected item. For example, delivery program 200 uses data from a corpus (e.g., database 144) of past deliveries to identify an item (i.e., a known item, like a cup of coffee). In this example, delivery program 200 uses order information (e.g., text that includes a label of the item) to identify an item based on data of the corpus.

In another example, delivery program 200 uses images corresponding to past deliveries stored in a database (e.g., database 144) to generate a visual recognition model. In this example, delivery program 200 uses the images of the database to create one or more labeled training sets for a multi-faceted model, where each set of training data corresponding to a different classification (e.g., box, cup, food, bottle, etc.). Additionally, delivery program 200 trains a model using the one or more training sets and positive examples are stored as classes, which may be grouped to define a model. Also, delivery program 200 inputs an image of a detected semantic object into the model, which returns a response that includes one or more classes that are identified in the image from the model and a confidence score for each class. The score represents a percentage, where higher values represent higher confidences, and does not return responses a class below a defined threshold (e.g., a score below (50%) 0.5). In this example, delivery program 200 allows a user to define a value of the defined threshold to determine a classification of the detected semantic object of the image.

In step 206, delivery program 200 determines information associated with the item. In various embodiments of the present invention delivery program 200 identifies a state of matter of contents of an item and characteristics associated with the identified state of matter. In one embodiment, delivery program 200 utilizes data of client device 120 and database 144 to determine content of a detected item. For example, delivery program 200 creates a corpus, which includes text, a collection of images, and damage and spill data collected from past deliveries. Delivery program 200 can store the corpus in one or more databases of a server (e.g., server 140) that is utilized to train a machine learning model to determine contents of a detected semantic object of the image.

Additionally, delivery program 200 trains the machine learning model using the one or more training sets and positive examples of the corpus stored in the one or more databases of the server to identify the detected semantic object. Furthermore, delivery program 200 utilizes damage and spill data collected from past deliveries in the corpus to associate properties of contents of the identified semantic object. In this example, delivery program 200 can utilize the machine learning model to identify food (e.g., including cooked food and beverages) and plants (e.g., including trees, shrubs, aquatic plants, vegetables). Moreover, delivery program 200 utilizes a classification (of step 204) and properties of the identified semantic objects of an image (e.g., strength, viscosity, etc.) to determine whether the identified content is susceptible to spills or damage due to inertial effects of delivery while in transit.

In decision step 208, delivery program 200 determines whether the information is associated with stabilized delivery. In one embodiment, delivery program 200 determines whether delivery of a detected item by delivery device 130 can utilize a gyro-enabled capsule. For example, delivery program 200 uses the classification, identified contents, and properties of a detected semantic object to determine whether the detected semantic object associated with a susceptibility to inertial effects of a delivery vehicle (e.g., delivery device 130) while in transit for delivery. In another example, a gyro-enabled capsule is a box coupled to a gyroscopic device that is coupled to a delivery vehicle (e.g., delivery device 130) so that the box will adjust in an axis of the box to be stable even while the delivery vehicle may be moving around due to turbulence or inertia when the delivery vehicle accelerates or decelerates.

If delivery program 200 determines that a detected semantic object is not susceptible to inertial effects of a delivery vehicle (e.g., delivery device 130) while in transit for delivery (decision step 208, "NO" branch), then delivery program 200 schedules a delivery of the detected semantic object with general delivery instructions. In one scenario, delivery program 200 determines that a detected semantic object of an image of an IoT enabled digital camera is classified as a bowl (step 204) and determines that the bowl includes oranges (step 206). Then based on delivery feedback of a corpus of a database (e.g., database 144) and properties (i.e., solid state of matter) associated with oranges, delivery program 200 determines that a delivery vehicle coupled with a gyro-enabled capsule is optional for delivery of the oranges.

In another scenario, delivery program 200 determines that a detected semantic object of an image of an IoT enabled digital camera is classified as a bottle (step 204) and determines that the bottle includes a liquid (step 206). Then, based on delivery feedback of a corpus of a database (e.g., database 144) and properties (e.g., plastic bottle with the ability to withstand an applied load without failure or plastic deformation) associated with the bottle, delivery program 200 determines that a delivery vehicle coupled with a gyro-enabled capsule is optional for delivery of the bottle that includes the liquid.

If delivery program 200 determines that a detected semantic object is susceptible to inertial effects of a delivery vehicle (e.g., delivery device 130) while in transit for delivery (decision step 208, "YES" branch), then delivery program 200 generates delivery instructions for the detected semantic object with the delivery vehicle. In one scenario, delivery program 200 determines that a detected semantic object of an image of an IoT enabled digital camera is classified as a cup (step 204) and determines that the cup includes pudding (step 206). Then, based on delivery feedback of a corpus of a database (e.g., database 144) and properties (i.e., amorphous state of matter) associated with pudding, delivery program 200 determines that a delivery vehicle coupled with a gyro-enabled capsule can be utilized for delivery of the pudding. In another scenario, delivery program 200 determines that a detected semantic object of an image of an IoT enabled digital camera is classified as a box (step 204) and determines that the box includes a pizza (step 206). Then, based on delivery feedback of a corpus of a database (e.g., database 144) and properties (e.g., semi-solid) associated with the pizza, delivery program 200 determines that a delivery vehicle coupled with a gyro-enabled capsule can be utilized for delivery of the pizza.

In step 210, delivery program 200 generates delivery instructions corresponding to the item. In one embodiment, delivery program 200 generates delivery instructions for a detected item. For example, delivery program 200 generates instructions to mark a detected semantic object that can utilize a gyro-enabled capsule as fragile. In another example, delivery program 200 generates instructions to route a detected semantic object that can utilize a gyro-enabled capsule via conveyor belt to a destination designated for items that can utilize stabilized delivery to prevent spills, leaks, and/or damage to the detected semantic object.

In step 212, delivery program 200 schedules a delivery of item with a delivery vehicle. In one embodiment, delivery program 200 schedules delivery of a detected item with delivery device 130 through application 134. For example, delivery program 200 transmits a message that includes a delivery address and item details to a delivery vehicle (e.g., delivery device 130) via a client-side application (e.g., application 134) of delivery program 200. In this example, delivery program 200 provides the delivery vehicle with instructions to locate and deliver a gyro-enabled capsule that includes a detected semantic object.

Figure 3:
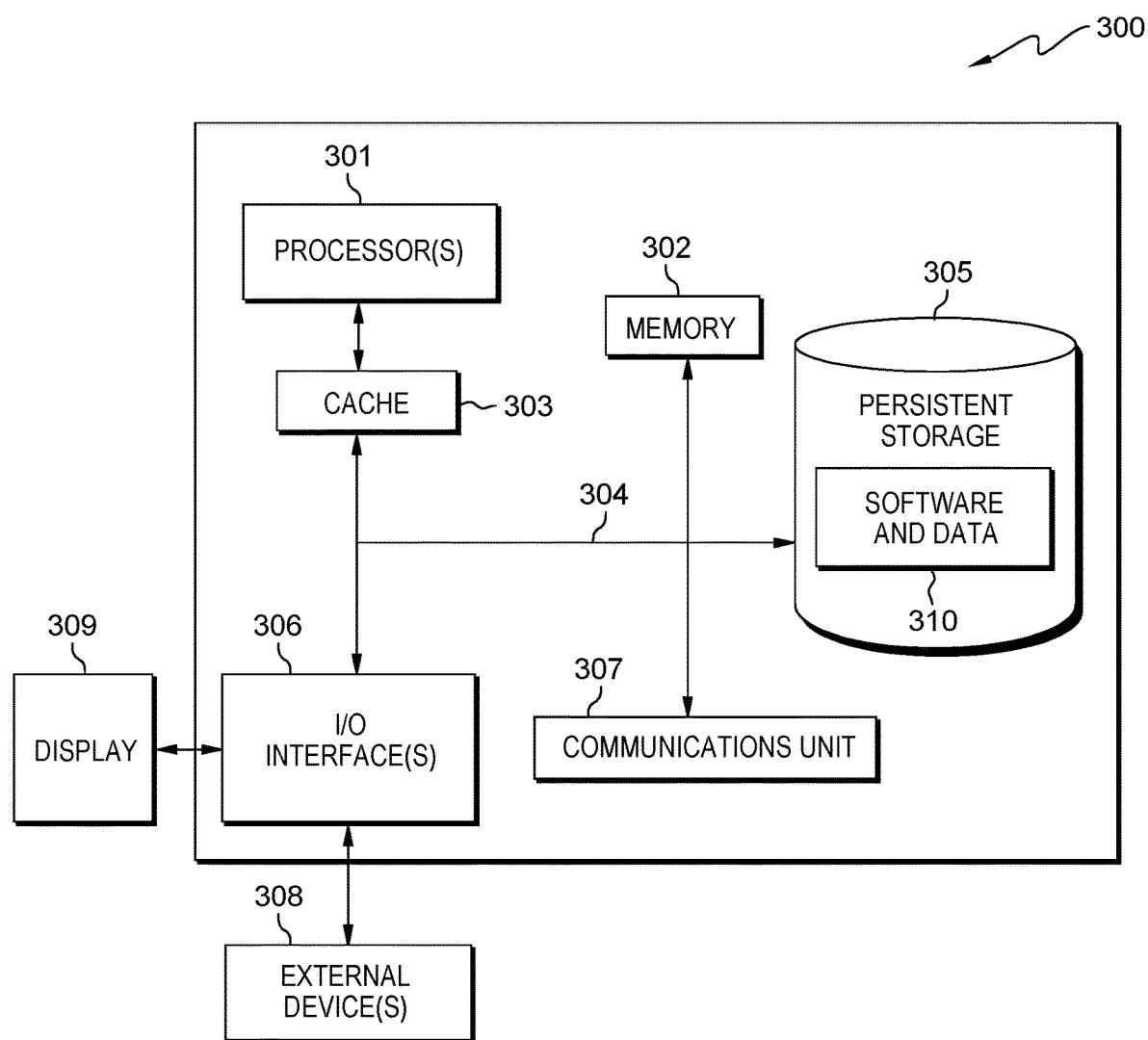
FIG. 3 is a block diagram of components of the client device and server of FIG. 1, in accordance with an embodiment of the present invention.

FIG. 3 depicts a block diagram of components of client device 120, delivery device 130, and server 140, in accordance with an illustrative embodiment of the present invention. It should be appreciated that FIG. 3 provides only an illustration of one implementation and does not imply any limitations with regard to the environments in which different embodiments may be implemented. Many modifications to the depicted environment may be made.

FIG. 3 includes processor(s) 301, cache 303, memory 302, persistent storage 305, communications unit 307, input/output (I/O) interface(s) 306, and communications fabric 304. Communications fabric 304 provides communications between cache 303, memory 302, persistent storage 305, communications unit 307, and input/output (I/O) interface(s) 306. Communications fabric 304 can be implemented with any architecture designed for passing data and/or control information between processors (such as microprocessors, communications and network processors, etc.), system memory, peripheral devices, and any other hardware components within a system. For example, communications fabric 304 can be implemented with one or more buses or a crossbar switch.

Memory 302 and persistent storage 305 are computer readable storage media. In this embodiment, memory 302 includes random access memory (RAM). In general, memory 302 can include any suitable volatile or non-volatile computer readable storage media. Cache 303 is a fast memory that enhances the performance of processor(s) 301 by holding recently accessed data, and data near recently accessed data, from memory 302.

Program instructions and data (e.g., software and data 310) used to practice embodiments of the present invention may be stored in persistent storage 305 and in memory 302 for execution by one or more of the respective processor(s) 301 via cache 303. In an embodiment, persistent storage 305 includes a magnetic hard disk drive. Alternatively, or in addition to a magnetic hard disk drive, persistent storage 305 can include a solid state hard drive, a semiconductor storage device, a read-only memory (ROM), an erasable programmable read-only memory (EPROM), a flash memory, or any other computer readable storage media that is capable of storing program instructions or digital information.

The media used by persistent storage 305 may also be removable. For example, a removable hard drive may be used for persistent storage 305. Other examples include optical and magnetic disks, thumb drives, and smart cards that are inserted into a drive for transfer onto another computer readable storage medium that is also part of persistent storage 305. Software and data 310 can be stored in persistent storage 305 for access and/or execution by one or more of the respective processor(s) 301 via cache 303. With respect to client device 120, software and data 310 includes data of user interface 122, application 124, and camera 126. With respect to delivery device 130, software and data 310 includes data of communication module 132 and application 134. With respect to server 140, software and data 310 includes data of storage device 142 and delivery program 200.

Communications unit 307, in these examples, provides for communications with other data processing systems or devices. In these examples, communications unit 307 includes one or more network interface cards. Communications unit 307 may provide communications through the use of either or both physical and wireless communications links. Program instructions and data (e.g., software and data 310) used to practice embodiments of the present invention may be downloaded to persistent storage 305 through communications unit 307.

I/O interface(s) 306 allows for input and output of data with other devices that may be connected to each computer system. For example, I/O interface(s) 306 may provide a connection to external device(s) 308, such as a keyboard, a keypad, a touch screen, and/or some other suitable input device. External device(s) 308 can also include portable computer readable storage media, such as, for example, thumb drives, portable optical or magnetic disks, and memory cards. Program instructions and data (e.g., software and data 310) used to practice embodiments of the present invention can be stored on such portable computer readable storage media and can be loaded onto persistent storage 305 via I/O interface(s) 306. I/O interface(s) 306 also connect to display 309.

Display 309 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method comprising:
   receiving, by one or more processors, image data about a delivery item from an internet of things (IoT) enabled device;
   identifying, by one or more processors, the delivery item requested for delivery, based on the image data received;
   determining, by the one or more processors, information associated with the delivery item indicating the delivery item is susceptible to inertial effects of delivery transit, based on utilizing a corpus of delivery feedback data of past damaged deliveries and the image data received identifying the delivery item;
   generating, by the one or more processors, delivery instructions designating stabilized delivery of the delivery item utilizing a gyro-enabled capsule maintaining stability of the delivery item within the capsule during delivery transit;
   scheduling, by the one or more processors, delivery of the delivery item with a delivery vehicle including the gyro-enabled capsule, based at least in part on the information associated with the delivery item.

2. The method of claim 1, wherein scheduling delivery of the delivery item with the delivery vehicle, further comprises:
   transmitting, by the one or more processors, a message to the delivery vehicle that includes a user address and of the generated delivery instructions for the delivery item.

3. The method of claim 1, wherein determining the information associated with the delivery item, further comprises:
   determining, by the one or more processors, a category of the delivery item based on features of the delivery item in digital imaging data from an IoT enabled device; and
   identifying, by the one or more processors, a state of matter of the delivery item based at least in part on the category.

4. The method of claim 3, wherein identifying the state of matter of the delivery item based at least in part on the digital imaging data of the IoT enabled device, further comprises:
   identifying, by the one or more processors, contents of the delivery item;
   determining, by the one or more processors, a classification of the contents of the delivery item, wherein the classification includes a state of matter; and
   determining, by the one or more processors, properties corresponding to the classification of the contents of the delivery item, wherein the properties are selected from a group consisting of: strength and viscosity.

5. The method of claim 1, wherein obtaining digital imaging data of a delivery item from the IoT enabled device, further comprises:
   capturing, by the one or more processors, digital images of the delivery item from a feed of the IoT enabled device;
   inputting, by the one or more processors, the digital images into a machine learning algorithm trained on a corpus of digital images to recognize delivery items prior to packing for delivery; and
   determining, by the one or more processors, that an object is present in an image of the digital imaging data, based on the corpus of digital images utilized to train the machine learning algorithm.

6. The method of claim 1, wherein the delivery vehicle includes a capsule coupled to a gyroscopic device that is coupled to the delivery vehicle, and wherein the inertial effects at least reduced by the gyro-enabled capsule includes acceleration, deceleration, and external forces acting on the delivery vehicle.

7. A computer program product comprising:
at least one computer readable storage medium and program instructions stored on the one or more computer readable storage medium, the program instructions comprising:
program instructions to receive image data about a delivery item from an internet of things (IoT) enabled device;
program instructions to identify the delivery item requested for delivery, based on the image data received;
program instructions to determine information associated with the delivery item indicating the delivery item is susceptible to inertial effects of delivery transit, based on utilizing a corpus of delivery feedback data of past damaged deliveries and the image data received identifying the delivery item;
program instructions to generate delivery instructions designating stabilized delivery of the delivery item utilizing a gyro-enabled capsule maintaining stability of the delivery item within the capsule during delivery transit; and
program instructions to schedule delivery of the delivery item with a delivery vehicle including the gyro-enabled capsule, based at least in part on the information associated with the delivery item.

8. The computer program product of claim 7, wherein program instructions to schedule delivery of the delivery item with the delivery vehicle, further comprise program instructions to:
transmit a message to the delivery vehicle that includes a user address and of the generated delivery instructions for the delivery item.

9. The computer program product of claim 8, wherein the delivery vehicle includes a capsule coupled to a gyroscopic device that is coupled to the delivery vehicle, and wherein the inertial effects at least reduced by the gyro-enabled capsule includes acceleration, deceleration, and external forces acting on the delivery vehicle.

10. The computer program product of claim 7, wherein program instructions to determine the information associated with the delivery item, further comprise program instructions to:
determine a category of the delivery item based on features of the delivery item in digital imaging data of an IoT enabled device; and
identify a state of matter of the delivery item based at least in part on the category.

11. The computer program product of claim 10, wherein program instructions to identify the state of matter of the delivery item based at least in part on the digital imaging data of the IoT enabled device, further comprise program instructions to:
identify contents of the delivery item;
determine a classification of the contents of the delivery item, wherein the classification includes a state of matter; and
determine properties corresponding to the classification of the contents of the delivery item, wherein the properties are selected from a group consisting of: strength and viscosity.

12. The computer program product of claim 7, wherein program instructions to obtain digital imaging data of a delivery item from the IoT enabled device, further comprise program instructions to:
capture digital images of the delivery item from a feed of the IoT enabled device;
input the digital images into a machine learning algorithm trained on a corpus of digital images to recognize delivery items prior to packing for delivery; and
determine that an object is present in an image of the digital imaging data, based on the corpus of digital images utilized to train the machine learning algorithm.

13. A computer system comprising:
one or more computer processors;
one or more computer readable storage media; and
program instructions stored on the computer readable storage media for execution by at least one of the one or more processors, the program instructions comprising:
program instructions to receive image data about a delivery item from an internet of things (IoT) enabled device;
program instructions to identify the delivery item requested for delivery, based on the image data received;
program instructions to determine information associated with the delivery item indicating the delivery item is susceptible to inertial effects of delivery transit, based on utilizing a corpus of delivery feedback data of past damaged deliveries and the image data received identifying the delivery item;
program instructions to generate delivery instructions designating stabilized delivery of the delivery item utilizing a gyro-enabled capsule maintaining stability of the delivery item within the capsule during delivery transit; and
program instructions to schedule delivery of the delivery item with a delivery vehicle including the gyro-enabled capsule, based at least in part on the information associated with the delivery item.

14. The computer system of claim 13, wherein program instructions to schedule delivery of the delivery item with the delivery vehicle, further comprise program instructions to:
transmit a message to the delivery vehicle that includes a user address and of the generated delivery instructions for the delivery item.

15. The computer system of claim 13, wherein program instructions to determine the information associated with the delivery item, further comprise program instructions to:
determine a category of the delivery item based on features of the delivery item in digital imaging data of an IoT enabled device; and
identify a state of matter of the delivery item based at least in part on the category.

16. The computer system of claim 15, wherein program instructions to identify the state of matter of the delivery item based at least in part on the digital imaging data of the IoT enabled device, further comprise program instructions to:
identify contents of the delivery item;
determine a classification of the contents of the delivery item, wherein the classification includes a state of matter; and determine properties corresponding to the classification of the contents of the delivery item, wherein the properties are selected from a group consisting of: strength and viscosity.

17. The computer system of claim 13, wherein program instructions to obtain the digital imaging data of a delivery item from the IoT enabled device, further comprise program instructions to:
- capture digital images of the delivery item from a feed of the IoT enabled device;
- input the digital images into a machine learning algorithm; and
- determine that an object is present in an image of the digital imaging data, based on a corpus utilized to train the machine learning algorithm.

* * * * *